United States Patent [19]
Kolvites

[11] Patent Number: 5,631,033
[45] Date of Patent: *May 20, 1997

[54] METHOD OF COOKING FOOD WITH STEAM

[76] Inventor: Albert Kolvites, 55 Yeager Rd., Mountaintop, Pa. 18707

[*] Notice: The term of this patent shall not extend beyond the expiration date of Pat. No. 5,549,083.

[21] Appl. No.: 661,171

[22] Filed: Jun. 10, 1996

Related U.S. Application Data

[63] Continuation of Ser. No. 558,727, Nov. 16, 1995, Pat. No. 5,549,038.
[51] Int. Cl.$^6$ .................................................... A23L 1/00
[52] U.S. Cl. .......................... 426/233; 426/510; 426/523
[58] Field of Search ............................. 426/510, 511, 426/233, 523; 126/369; 99/330, 467

[56] References Cited

U.S. PATENT DOCUMENTS 5,368,008  11/1994  Oslin ...................................... 126/369

*Primary Examiner*—George Yeung
*Attorney, Agent, or Firm*—Michael Ebert

[57] ABSTRACT

A modulated steam cooker in which food to be cooked is received in an oven chamber having an access door associated with a door switch, steam being fed directly into the oven by a steam generator having an electric heater immersed in a pool of water. The heater is connected through the door switch to a power source whereby the generator is powered only when the door is shut. The pressure of steam draining from the oven is sensed by a pressure-responsive switch interposed between the heater and the power source, the pressure switch intermittently interrupting the power supplied to the heater only when the sensed pressure exceeds a predetermined level somewhat above atmospheric pressure, thereby modulating the generation of steam supplied to the oven as a function of the quantity and temperature of food therein to effect efficient cooking of the food. Mounted on the steam generator is a spray head supplied with water only when the door is opened. The head then emits a spray of water which quenches the steam in the generator, the resultant pressure drop causing steam to be sucked back from the oven into the steam generator whereby little steam escapes from the opened door and the person opening the door is not subjected to hazardous steam.

4 Claims, 2 Drawing Sheets

METHOD OF COOKING FOOD WITH STEAM

RELATED APPLICATION

This application is a continuation of my application Ser. No. 08/558,727 filed Dec. 16, 1995 entitled "Modulated Steam Cooker", now U.S. Pat. No. 5,549,038.

BACKGROUND OF INVENTION

1. Field of Invention

The present invention relates generally to steam cookers., and more particularly to a steam cooker in which the flow of steam into an oven chamber in which food is received is modulated as a function of the quantity and temperature of the food in the chamber to effect efficient cooking thereof.

2. Status of Prior Art

Steam is water vapor, this being the gaseous phase of water which occurs when water is boiled. The freezing and boiling points of water at atmospheric pressure determine respectively the zero degree and hundred degree points on the centigrade scale. The cloudy mist seen when water boils is not truly steam which is a colorless and invisible gas, but consists of fine water droplets. Hence true steam is sometimes referred to as dry steam, and when dry steam is beginning to condense back to water droplets, it is then referred to as wet steam. In the present invention the term steam is applicable to both wet and dry steam.

The use of a "pressure cooker" to cook food is well-known, this being an air tight pot or oven chamber that uses steam under pressure at a high temperature to cook food far more quickly than food can be cooked by steam in an unsealed oven at close to atmospheric pressure. One objection to a pressure cooker is that it is costly to make, for it must satisfy pressure vessel safety regulations.

But a more serious drawback of a pressure cooker is that in cooking frozen vegetables or other frozen products which must be thawed, the transfer of thermal energy with pressurized steam at high temperatures is so rapid that before the core of the frozen food is adequately cooked, the exterior regions of the food begin to overcook. Hence pressure cookers often fail to cook food properly.

Steamers which are not pressure cookers, though slower to cook than pressure cookers are far less dangerous to use. A pressure cooker becomes hazardous when the internal steam pressure reaches a level well above the pressure rating of the vessel, at which point the pressure cooker might explode. Moreover, conventional pressureless steamers make it possible for a chef to operate the steamer as he does a conventional oven so that its door can be opened and closed without being concerned about the release of internal steam pressure.

U.S. Pat. 5,368,008 discloses an atmospheric convection type steamer having at least one oven chamber and a discrete atmospheric steam generator or boiler placed below the oven from which steam is piped up to the oven. The steam delivery efficiency of this known arrangement is not high, for there is a loss of thermal energy when conveying steam through pipes.

In a conventional pressureless steamer in which steam is supplied to an oven by a boiler and the oven is provided with an access door, when the oven is opened to remove the cooked food, steam is then released to the atmosphere. This rush of steam may cause severe burns on the hands and face of the operator unless he exercises care in positioning himself away from the oven when opening its door. But when the operator is a busy chef, he may on occasion fail to stand back and away from the oven when opening its door.

Another problem encountered with conventional pressureless steam cookers is excessive water consumption. In such cookers, water boiled in a steam generator is piped into an oven in which the food is received, and steam is drained from the oven through a drain pipe leading to a waste line. Many local codes which regulate the operation of steam cookers and other water heating devices, interdict feeding water down a drain whose temperature is above 140° F. To comply with these regulations, the present practice is to spray cooling water into the steam exit to reduce the temperature of the condensate fed into the drain line to an acceptable lower level. This gives rise to water consumption in commercial steam cookers that may run as high as 58 gallons per hour, regardless of the quantity of food being cooked.

Moreover, the thermal efficiency of a conventional pressureless steam cooker is not high, for regardless of the quantity of food being steamed in the oven the flow of steam into the oven from a steam generator is continuous. This is wasteful of thermal energy, for in the initial phase of cooking a food product that is at room temperature or is in a frozen state, the volume of steam required at the outset of cooking must be high. But when the food produced is thereafter in a heated condition, less steam is then required to complete the cooking operation. Thus conventional pressureless steam cookers do not take into account the varying demand for steam in the course of a cooking operation.

Another factor which impairs the efficiency of a steam cooker is the build-up of lime on the electric heater coils or the tubes of the steam generator because of the mineral content of the water being boiled. The resultant lime coating acts as a thermal insulating layer, thereby causing highwatt density heaters which are immersed in water to overheat and self-destruct. In some instances, the water is boiled by a gas-fired water-tubes boiler. The present practice is to remove the lime coating on the heater coils or the boiler tubes by means of a chemical solvent. But before the steam generator can be put back into service, the solvent must be completely flushed away, otherwise the solvent will contaminate the steam. This need to completely wash away the solvent presents practical difficulties.

SUMMARY OF INVENTION

In view of the foregoing, the main object of this invention is to provide a steam cooker which obviates the drawbacks of prior art cookers, the cooker being adapted to cook food by subjecting the food placed in an oven to a flow of steam that is modulated as a function of the quantity and temperature of food to effect efficient cooking thereof.

A significant feature of a steam cooker in accordance with the invention is that it is free of hazards, for when the door of the oven is opened, little steam then escapes through the open door. This steam cooker is of the type in which the steam generator includes an electric heater coil immersed in a pool of water or of the type in which the steam generator is a gas-fired boiler which is electrically controlled, hence both types of steam generation can be electrically switched on.

Also an object of the invention is to provide a steam cooker of the above type which operates effeciently, yet has a relatively low water consumption, the water drained from the cooker and discharged into a waste line being at an acceptably reduced temperature to comply with local regulations.

Still another object of the invention is to provide a steam cooker in which the modulation of the flow of steam is visually indicated so that a chef may observe the rate at which the food is being steam cooked and know when a cooking operation approaches completion.

Yet another object of the invention is to provide a more efficient method for de-liming the electric heater coil or boiler tubes of the steam generator, and for visually indicating when the heater coil or tubes is in need of deliming.

Briefly stated, these objects are attained by a modulated steam cooker in which food to be cooked is received in an oven chamber having an access door associated with a door switch, steam being fed directly into the oven by a steam generator having an electric heater or electrically activated gas heater. The heater circuit is connected through the door switch to an electric source whereby the steam generator is actuated only when the door is shut.

The pressure of steam draining from the oven is sensed by a pressure-responsive switch interposed between the heater and the electric source, the pressure switch intermittently interrupting power supplied to the heater only when the sensed pressure exceeds a pre-determined level somewhat above atmospheric pressure, thereby modulating the generation of steam supplied to the oven as a function of the quantity and temperature of food therein to effect efficient cooking of the food.

Mounted on the steam generator is a spray head supplied with water only when the door is opened. The head then emits a spray of water which quenches the steam in the generator, the resultant pressure drop causing steam to be sucked back from the oven into the steam generator whereby little steam escapes from the opened door and the person opening it is not subjected to hazardous steam.

BRIEF DESCRIPTION OF DRAWING

For a better understanding of the invention, as well as further object and features thereof, reference is made to the detailed description thereof to be read in conjunction with the accompanying drawings wherein.

DESCRIPTION OF INVENTION

Figure 1:
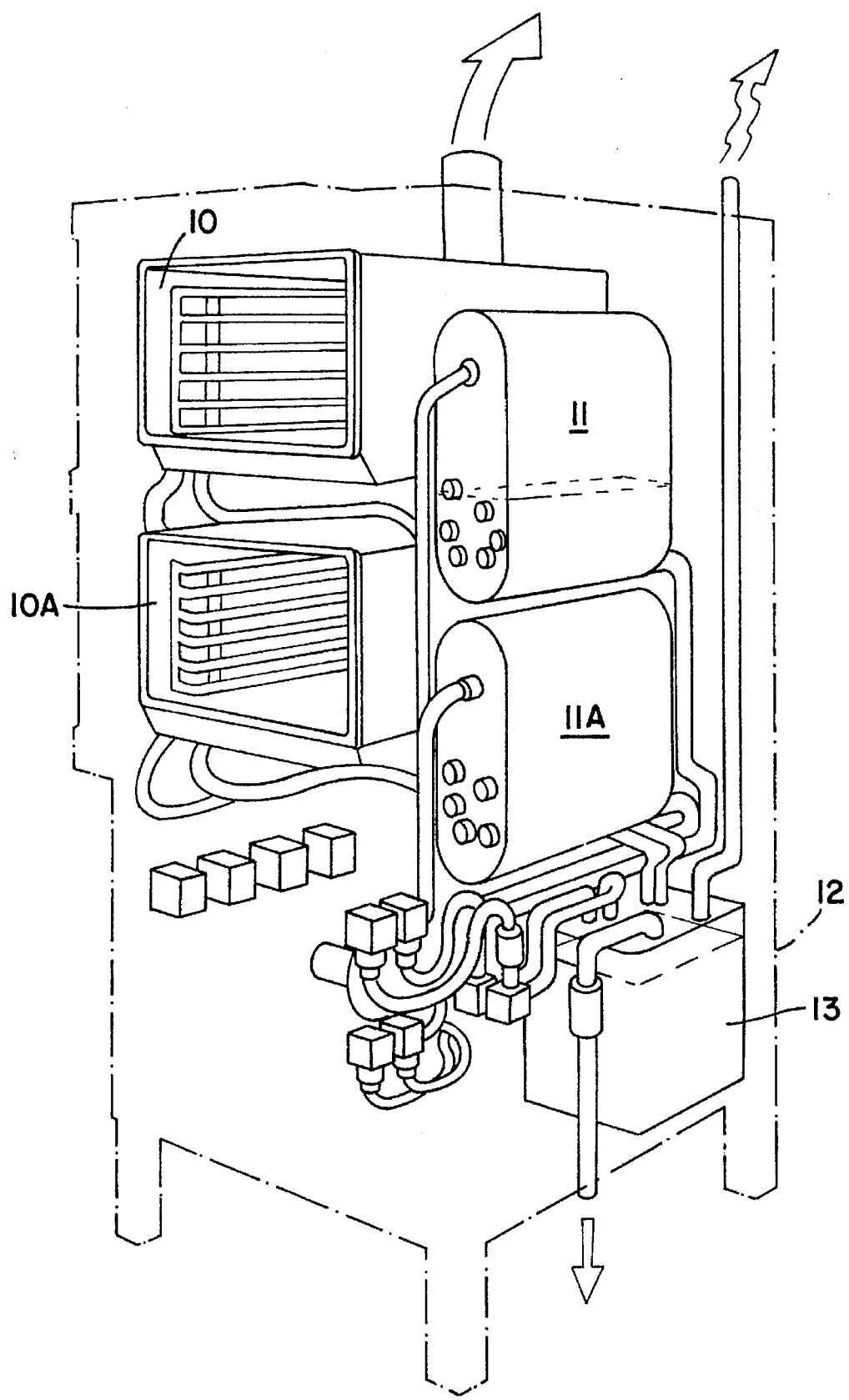
FIG. 1 illustrates in phantom view a steam cooker in accordance with the invention provided with a pair of oven chambers, each having associated therewith a steam generator.

Modulated Steam Cooker:

As shown in FIG. 1, a dual steam cooker in accordance with the invention includes a pair of oven chamber 10 and 10A in superposed relation, the doors of these chambers being omitted to expose their interior cavity which is adapted to receive food to be cooked. Mounted directly against one side of upper chamber 10 is a steam generator 11, while mounted directly against one side of lower chamber 10A is a steam generator 11A. The oven chambers and associated steam generators are supported within the upper half of a cabinet 12. Resting on the bottom of the cabinet is a tempering water tank 13 which condenses steam drained from the oven.

Figure 2:
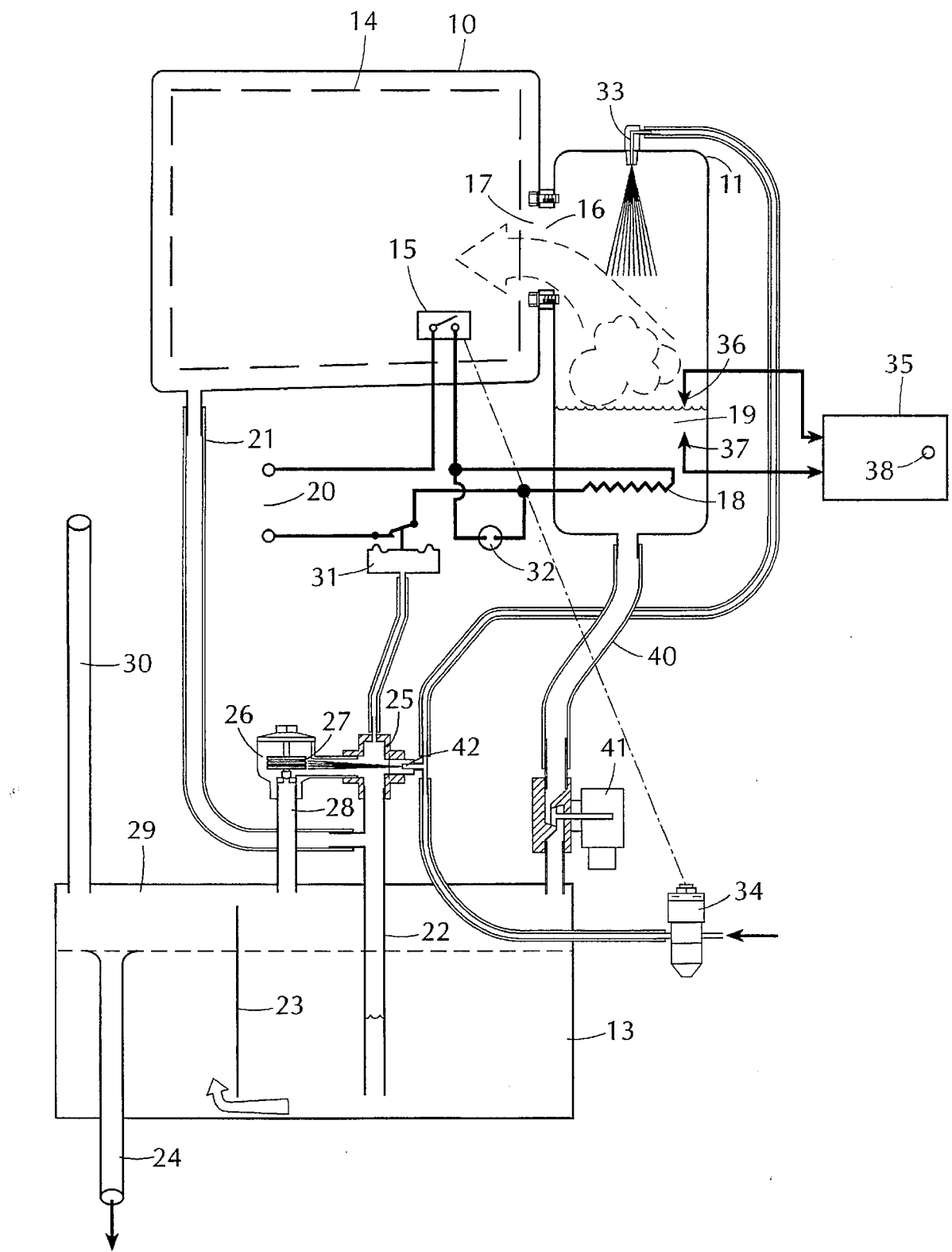
FIG. 2 is a schematic diagram of a steam cooker having a single oven chamber, a steam generator bolted thereto, and the associated control mechanisms to effect efficient, hazard-free cooking.

The invention will be described in connection with FIG. 2 which shows only oven chamber 10 and steam generator 11, the control system associated therewith being the same for oven chamber 10A and steam generator 11A omitted from this figure.

Oven chamber 10 is provided with an access door 14 having operatively coupled thereto an electrical door switch 15 which is closed when the door is shut and opened only when the door is opened. Steam generator 11 is provided on one side with an output port 16 which registers with an input port 17 in the adjacent side of oven 10. Steam generator 11 is bolted to oven 10 so that the steam produced in the generator flows directly through the intercoupled ports 16 and 17 into the oven to cook the food, thereby avoiding the need for piping and the resultant energy transfer losses.

Steam generator 11 includes an electric heater coil 18, immersed in a pool of water 19, the heater being connected through oven door switch 15 to a power source 20 so that the steam generator is powered to produce steam only when the door is closed. Door switch 15 may be of the magnetic type which is actuated by a permeability element mounted on the edge of the door in close proximity to the switch only when the door is closed. When the heater in steam generator is of the gas-fired boiler type, is electrically controlled, so that when the oven door is closed to actuate door switch 15, the switch then turns on the boiler.

When steam generator 11 feeds steam into the cavity of oven 10 and fills this cavity, the only exit path for the condensate or steam is through a drain tube 21 whose inlet is mounted on the floor of the oven. Drain tube 21 is coupled at a fork to two branches, one being a water seal tube 22 immersed in the tempering water tank 13. Tempering tank 13 is provided with a baffle 23 so placed that only relatively cool water in the lower region of the water pool in the tank, as shown by the arrow, is permitted to overflow into an overflow drain pipe 24 leading to a waste line.

Hence while steam fed through drain tube 21 into water-seal tube 22 is condensed in the water pool in tank 13, it serves in time to raise the pool temperature to above 140° F. But because of baffle 23, the overflow of water going into overflow drain is at a lower acceptable temperature. In practice, however, to ensure that the water going into the overflow drain 24 is not above 140° F., cool water may be intermittently sprayed into the tank.

The other branch of drain tube 21 leads to a junction 25 coupled to a steam trap 26. Mounted in this trap is a bellows-operated valve 27 coupled to a tube 28 leading to an air space 29 in tank 13 above the water line therein, the air space being vented to the atmosphere through a vent pipe 30. When the bellows actuated valve 27 is open, the steam trap is exhausted to the atmosphere.

After food is placed in the cavity of oven 10 and the door is closed to activate the associated steam generator 11, the steam then fed into the oven cavity displaces the cold air therein. This cold air impinges on bellows 26 so that the bellows is contracted and its valve is opened to discharge the cold air through tube 28 into the air space 29 in the tank, from which the cold air is exhausted into the atmosphere through vent tube 30.

But when the oven heats up and the steam trap bellows 27 is subjected to steam at a temperature close to 212° F., the heated bellows valve then closes, cold air having been evacuated from the oven and steam filling the entire system.

Associated with junction 25 is a pressure sensitive diaphragm switch 31 which is interposed between electric heater 18 and power line 20, the switch being normally closed to supply power to the heater. The pressure switch 31 functions to intermittently interrupt power to the electric heater and cut off the steam generator when the pressure of steam in the drain line 21 coupled to junction 25 rises somewhat above atmospheric pressure (one or two inches water column pressure), in which event pressure switch 31 opens to interrupt the operation of the steam generator until such time as the steam pressure in junction 25 falls to atmospheric and the switch closes to resume operation of the steam generator.

If the quantity of food in the cavity of the oven is small, the demand for steam is low. Since the food can only accept steam energy at a rate that depends on its surface area and temperature, with small quantities of food in the oven, the steam generator will be turned on to make steam for a few seconds. And because the food cannot absorb all of the steam being generated, the internmal pressure in the cavity of the oven will begin to rise, this rise being sensed by pressure switch 31 coupled to junction 25 which will turn the generator off. Thus with small amounts of food in the cooking cavity, the steam generator will go on for a few seconds and then stay off for 10 to 15 seconds while the energy of the excess steam continues to cook the food. But with a heavy food load in the oven, the steam generator will be kept on for several minutes before being turned off.

Thus the modulation pattern of the steam flow into the oven depends on the quantity and temperature of food therein to be cooked, and serves to effect efficient cooking in which no more steam is supplied to the food than is required in the course of a cooking operation.

By reason of the small amount of internal steam pressure to control the generation of steam and thereby modulate the flow of steam into the oven, the efficiency of the system is considerably improved, for steam is only produced when the oven needs it.

Because the steam flow is modulated, there is no significant excess of hot steam that would otherwise have to be dumped, in which case as in prior steamers, it would be necessary to provide a continuous spray of cooling water in the drain pipe leading to a waste line, so that the water consumption of the system would then be very high.

The modulation pattern of the steam flow is determined by the power cycling of heater 18, this being indicative of the cooking rate. By shunting a neon light 32 or other visual indicator across the heater, a chef can see how cooking is progressing. Thus when the food is placed in the oven and proceeds to cook, initially the demand for steam is very high, for the food is only beginning to warm up. As a consequence, neon light 32 is at first on almost continuously. Then as the food begins to absorb heat, and the demand for steam diminishes, the neon light begins to blink, thereby indicating that the heater is being to turned off intermittently.

When the food is just about fully cooked, and the demand for steam is then relatively small, neon light 32 would then blink on for one second or less and be off for 10 to 15 seconds. Hence neon light 32 functions as a steam demand light to indicate to the chef the cooking progress and how close the food is to its fully cooked state.

Steam Suppression:

When an operator has occasion to open door 14 of the oven 10 to see whether the food is yet fully cooked or upon completion of cooking, it is important that the operator not then be subjected to hot steam escaping from the open door, for such steam could seriously burn the operator.

In order, therefore, to prevent hot steam from escaping from the opened door of the oven, a steam suppression system is provided that includes a spray head 33 mounted on top of steam generator 11. Head 33 is supplied with water from a water supply through a solenoid-actuated water valve 34. Valve 34 which is normally closed is operatively coupled to oven door switch 15 so that when the door switch is open, the valve then opens for a few seconds to supply water to spray head 33. Water is also then supplied into junction 25 through a spray nozzle 42 to cool bellows 27 and thereby open the valve to vent the steam trap 26.

Spray head 33 then emits a mist spray into steam generator 11, thereby condensing the steam therein. The resultant pressure drop which takes place when the water vapor is converted to water, acts to suck back into steam generator 11 through port 16 and 17 whatever steam is then contained in the oven 10; hence little steam escapes from the oven when its door is opened.

Another objection to the escape of steam when the oven door is opened is that should the operator be wearing glasses, they will be clouded by the steam and rendered ineffective just when the operator has a need to see the food in the oven in order to withdraw it from the oven. Hence the suppression of steam when the oven door is opened is an important feature of the invention.

De-Liming:

In steam generators in which an electric heater coil is immersed in water having a natural mineral content, there is a gradual build up of lime on the coil. This lime functions as a thermal insulator and reduces the efficiency of the heater. The usual practice in removing lime from a heater coil is to use vinegar or a stronger chemical solvent for this purpose. This solvent must be completely removed before again putting the steam generator to use in steaming food contained in an oven, for the solvent, if present, will contaminate the steam.

In order to advise the operator of the system that the electric heater is in need of de-liming, a timer 35 is provided which is coupled to a water level sensor 36 that applies a signal to the timer and heater when the water in pool 19 reaches a desired level. The timer is also operatively coupled to heat sensor 37 set to 193° F. so that the timer proceeds to time out when the heater goes on.

The timing period of the timer is set to reflect a condition in which de-liming is not yet necessary. If, therefore, the water heats up in a reasonable period of time, timer 35 is disabled when it times out, and no indication is given. But if the timer times out before the pool of water 19 comes up to the preset temperature of 193° F. of sensor 37, then an indicator 38 goes on to indicate that the heater is lime coated and requires de-liming. Indicator 38 is therefore so connected to the timer circuit that it turns on only when at the conclusion of the timing period, the water temperature in the pool is below the preset temperature of 193° F. of temperature sensor 37.

Additionally, the timer circuit is designed that upon the first indication of the need for deliming the operator may continue to use the steamer to cook food. By using a memory device, then upon the second time when the timer senses the need for deliming, the associated circuit will allow the steam generator temperature to rise to 193° F., but will disable the steam generation circuit. The water in the generator is allowed to rise to 193° F. because this elevated temperature accelerates the activity of deliming solutions, thus shortening the time required for deliming.

When de-liming heater coil 18, applied thereto is a suitable chemical solvent after which the coil must be thoroughly flushed with water by means of spray head 33. It is then necessary to despose of the flushed solvent, and for this purpose the solvent contaminated water in the steam generator 11 is dumped into tempering tank through a drain pipe 40. A solenoid operated valve 41 in drain pipe 40 which is normally closed when the heater is powered, is opened when after the heater coil is delimed and flushed it then becomes necessary to discharge the solvent dissolved in the flushing water into the tempering tank.

Thus a modulated steam cooker in accordance with the invention modulates the flow of steam fed into the oven as a function of the food load therein to effect efficient cooking, steam being suppressed to prevent its escape when the oven door is opened.

It is again noted that the steam generator included in the cooker may be of any available commercial type that is electrically controlled, so that if instead of an electrically-powered heater coil, use is made of an electrically-activated gas-fired boiler for producing steam, both types of generators are similarly modulated.

While there has been shown a preferred embodiment of the invention, it is to be understood that many modifications may be made without departing from the essential spirit of the invention.

I claim:

1. A method of cooking food with steam comprising the steps of:
   A. placing the food to be cooked in an oven chamber provided with an access door;
   B. generating steam in a generator and feeding it into the oven chamber when its door is closed to cook the food therein; and
   C. modulating the flow of steam fed into the oven chamber as a function of the quantity and temperature of the food being cooked to effect efficient cooking thereof, the flow of steam fed into the oven chamber being modulated by draining steam from the oven chamber, sensing the pressure of the steam drained from the oven chamber, and interrupting the generator feeding steam into the oven chamber when the sensed pressure rises to a level above atmospheric pressure.

2. A method as set forth in claim 1, in which when the door to the oven chamber is opened to remove the cooked food, water is then spayed into the steam generator to quench the steam therein, whereby the resultant pressure drop causes steam then in the oven chamber to be sucked back into the generator to prevent the escape of steam from the opened door.

3. A method as set forth in claim 1, in which steam drained from the oven chamber is fed into a water pool in a tempering tank vented to the atmosphere.

4. A method as set forth in claim 1, in which the steam generator includes an electric heater coil immersed in water having a natural mineral content causing a gradual buildup of lime on the coil, further including the step of sensing when the coil is in need of deliming.

* * * * *